US012511970B2

(12) United States Patent
Deckenbach et al.

(10) Patent No.: US 12,511,970 B2
(45) Date of Patent: Dec. 30, 2025

(54) SENSOR FOR VERIFYING THE LUMINESCENCE OF VALUE DOCUMENTS

(71) Applicant: GIESECKE+DEVRIENT CURRENCY TECHNOLOGY GMBH, Munich (DE)

(72) Inventors: Wolfgang Deckenbach, Schechen (DE); Werner Heimann, Munich (DE); Johann Wagner, Gundlkofen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 212 days.

(21) Appl. No.: 18/546,454

(22) PCT Filed: Feb. 15, 2022

(86) PCT No.: PCT/EP2022/025050
§ 371 (c)(1),
(2) Date: Aug. 15, 2023

(87) PCT Pub. No.: WO2022/174979
PCT Pub. Date: Aug. 25, 2022

(65) Prior Publication Data

US 2024/0135768 A1 Apr. 25, 2024
US 2024/0233468 A9 Jul. 11, 2024

(30) Foreign Application Priority Data

Feb. 16, 2021 (DE) ..................... 10 2021 000 807.3
Jun. 29, 2021 (DE) ..................... 10 2021 003 334.5

(51) Int. Cl.
*G07D 7/121* (2016.01)
*G07D 7/1205* (2016.01)

(52) U.S. Cl.
CPC ........... *G07D 7/121* (2013.01); *G07D 7/1205* (2017.05)

(58) Field of Classification Search
CPC ............................. G07D 7/121; G07D 7/1205
See application file for complete search history.

(56) References Cited

U.S. PATENT DOCUMENTS 7,648,763 B2 * 1/2010 Heim ..................... B42D 25/29 428/689
9,989,411 B2 6/2018 Deckenbach et al.
(Continued)

FOREIGN PATENT DOCUMENTS

DE 102010014912 A1 10/2011
DE 102012025263 A1 6/2014
(Continued)

OTHER PUBLICATIONS

German Search Report from corresponding DE Application No. 102021000807.3, Nov. 8, 2021.
(Continued)

*Primary Examiner* — Blake C Riddick
(74) *Attorney, Agent, or Firm* — Workman Nydegger

(57) ABSTRACT

A sensor for verifying value documents is designed to determine a luminescence characteristic of a value document that is moved past the sensor for verification purposes, and the provision of a velocity correction of the luminescence characteristic of the value document in the sensor, resulting in a distortion of the measured luminescence intensities. A reference sensor is used to determine an average velocity dependency of the luminescence characteristic of a reference medium, said average velocity dependency being averaged over both opposite directions of movement and being used to determine a velocity dependency of a corrective factor for the luminescence characteristic. Said determined velocity dependency is used to determine the corrective factor for the (Continued)

luminescence characteristic, said corrective factor applying to the velocity of the movement of the value document during the verification process, and the luminescence characteristic is then corrected by said corrective factor.

16 Claims, 3 Drawing Sheets

(56) References Cited

U.S. PATENT DOCUMENTS

| | | | | |
|---|---|---|---|---|
| 11,467,087 | B2 | 10/2022 | Sato et al. | |
| 2005/0161501 | A1* | 7/2005 | Giering | B42D 25/29 235/379 |
| 2006/0233668 | A1* | 10/2006 | Resch-Genger | C09K 11/06 356/243.1 |
| 2007/0165208 | A1* | 7/2007 | Cowburn | G06V 10/431 356/71 |
| 2009/0190121 | A1* | 7/2009 | Hegyi | G01N 15/1429 356/402 |
| 2011/0174051 | A1* | 7/2011 | Sacquard | G07D 7/17 73/1.79 |
| 2013/0301086 | A1* | 11/2013 | Holl | G07D 7/2008 358/447 |
| 2015/0348351 | A1 | 12/2015 | Deckenbach et al. | |
| 2016/0225215 | A1* | 8/2016 | Yamaguchi | G07D 7/005 |
| 2019/0238829 | A1* | 8/2019 | Reinhard | G07D 7/121 |
| 2020/0394864 | A1* | 12/2020 | Kure | G01N 21/86 |
| 2021/0116370 | A1 | 4/2021 | Sato et al. | |
| 2021/0209886 | A1 | 7/2021 | Kure et al. | |

FOREIGN PATENT DOCUMENTS

| | | | |
|---|---|---|---|
| EP | 3754619 | A2 | 12/2020 |
| EP | 3839902 | A1 | 6/2021 |
| WO | 2018181134 | A1 | 10/2018 |
| WO | 2020059610 | A1 | 3/2020 |

OTHER PUBLICATIONS

German Search Report from corresponding DE Application No. 102021003334.5, Feb. 10, 2022.

International Search Report from corresponding PCT Application No. PCT/EP2022/025050, Jun. 28, 2022.

International Search Report from corresponding PCT Application No. PCT/EP2022/025049, Jun. 28, 2022.

* cited by examiner

SENSOR FOR VERIFYING THE LUMINESCENCE OF VALUE DOCUMENTS

BACKGROUND

The invention relates to a sensor for verifying the luminescence of value documents and providing a velocity correction of a luminescence parameter in the sensor.

Sensors are normally used to verify value documents, using which the type of the value documents is determined and/or using which the value documents are verified for authenticity or for their status. The value documents are verified in a device for value document processing, which contains, depending on the value document properties to be verified, one or more different sensors. To verify the value documents, they are normally transported past the fixed sensor.

A value document to be verified can include one or more luminescent materials, of which, for example, the decay time of the temporal intensity curve of the luminescence or spectral properties of the luminescence can be verified. The luminescent materials of the value document can be present in areas or over the entire surface on or in the value document. To check the decay time of the luminescence, illuminating value documents using light pulses and, in the dark phase between the light pulses, detecting the luminescence intensity of the value document at various times after the end of the excitation pulse is known. Then, for example, the decay time of the luminescence is determined from the temporal decay of the luminescence intensity and used for authenticity verification of value documents.

The value document verification up to this point has had the disadvantage that in case of a high transport velocity of the value document, a temporal intensity curve of the luminescence is detected which is corrupted in comparison to a statically detected intensity curve. At high transport velocities of the value document, a luminescence parameter such as the luminescence time constant can therefore only be determined inaccurately.

SUMMARY

This object is achieved by the subjects of the independent claims. Advantageous refinements and embodiments of the invention are specified in claims dependent thereon.

If the luminescence of the value document is detected statically, i.e., without relative movement between the value document and the sensor, the detected intensity curve of the luminescence is thus not corrupted by movement effects. A luminescence time constant can then be ascertained directly from the statically detected intensity curve as a function of time. In resting value documents, the measured luminescence time constants correspond well for various sensors of the same sensor production series and for the same sensor in various installation locations.

In case of a relative movement between value document and sensor, however, the detected intensity curve is corrupted due to movement effects. In sensors which are used on fast value document processing devices, the value document shifts during the measurement by a length which is comparable to the size of the detection and illumination area of the sensor. Since the area of the value document excited to luminescence is partially transported out of the (fixed) detection area during the detection, a corruption of the measured luminescence intensities of the value document results.

In the preliminary stages of the invention, it has been established that the corruption of a measured luminescence intensity at given transport velocity is dependent on how well the focal point of the illumination area and the focal point of the detection area of the sensor used correspond, in particular how large their offset is along the transport direction of the value document. With perfect coincidence of the focal points, the corruption of the intensity is only dependent on the absolute value of the transport velocity, but not on the transport direction. On the other hand, if the illumination area is offset somewhat from the detection area by mechanical tolerances, differences of the measured luminescence intensities then result in dependence on the transport direction of the value document relative to the sensor and thus also in the luminescence parameters ascertained therefrom for the intensity or the time behavior.

Surprisingly, it has been established that in sensors of the same sensor production series, the velocity dependence of a luminescence parameter, averaged over both transport directions of the value document relative to the sensor, is almost equal for sensors having worse and better tolerances. Therefore, correction factors or a velocity dependence of a correction factor, which are used for all sensors of the same sensor production series for velocity correction, may be derived from the velocity dependence of the luminescence parameter averaged over both transport directions of the value document. It is often sufficient to carry out the velocity correction of the luminescence parameter for all sensors of the same sensor production series in the same manner, only in dependence on the transport velocity of the value document.

However, it has also been established that in some cases in the detection of a luminescence parameter on fast value document processing devices, additional measurement errors can occur in various sensors of the same sensor production series, which are also to be attributed to geometric tolerances in the position and possibly the angle of the illumination and the detector, in particular to an offset of a different size between illumination area and detection area in the direction perpendicular to the transport direction. The additional measurement errors can possibly not be completely compensated for by the correction according to the invention. In such cases, in addition to the sensor-comprehensive correction of the luminescence parameter with respect to the transport velocity according to the invention, a sensor-individual correction of the luminescence parameter can thus be carried out, which is not the same for all sensors of the same sensor production series, rather is different for various, nominally identical sensors of the same sensor production series.

Velocity Correction of a Luminescence Parameter

The sensor according to the invention is configured for verifying the luminescence of value documents, which are transported past the sensor along a transport direction at a verification transport velocity for their verification.

The sensor is configured for measuring at least one luminescence intensity of the value document while the respective value document is transported past the sensor, and for determining at least one luminescence parameter of the respective value document on the basis of the at least one measured luminescence intensity. The luminescence parameter of the value document is a characteristic variable of the at least one measured luminescence intensity of the value document. The method described hereinafter for providing a velocity correction of at least one luminescence parameter of a value document to be verified is carried out at the sensor.

The sensor includes at least one excitation light source for exciting a luminescence of the value document and at least one photodetector for detecting the luminescence of the value document excited by the excitation light source. The excitation light source of the sensor is designed to illuminate an illumination area of the value document using excitation light. The luminescence excitation is achieved, for example, by an excitation pulse which the excitation light source directs onto the value document. The value document to be verified includes a security feature, which contains one or more luminescent materials that emit a luminescence. As a reaction to the luminescence excitation by the excitation light source, the security feature emits a luminescence at one or more wavelengths.

The sensor is configured to measure the at least one luminescence intensity of the value document by means of the photodetector while the value document is transported past the sensor. The photodetector of the sensor is designed to detect the luminescence light, which originates from a value document introduced into the measurement plane as a result of the illumination using the excitation light, in a detection area.

The sensor includes an evaluation device, which is designed to determine a luminescence parameter of the respective value document on the basis of the at least one luminescence intensity of the value document measured at the verification transport velocity. For this purpose, the evaluation device includes, for example, corresponding software. On the basis of the luminescence parameter, the sensor verifies the value document, for example, for a quality verification of the value document during the production or for an authenticity verification or classification of the value document. In particular, a velocity dependence of a (non-sensor-individual) correction factor is stored in the sensor, which is suitable for correcting the luminescence parameter of the value document to be verified.

The sensor includes a correction device for correcting the luminescence parameter with respect to the verification transport velocity of the value document to be verified. A velocity correction for correcting the luminescence parameter determined using the sensor for the value document will be/is provided in the correction device, which is usable in the verification of the luminescence of a value document transported past the sensor at a verification transport velocity for correcting the luminescence parameter determined using the sensor for the value document. The velocity correction is contained in the correction device of the sensor. The correction device can be a processor. The velocity correction can be carried out by a software of the correction device.

The velocity dependence K(v) of the (non-sensor-individual) correction factor, which is stored in the sensor, is used for the velocity correction, in particular a velocity dependence K(v) of the correction factor applying in a sensor-comprehensive manner (i.e., not applying in a sensor-individual manner), which preferably applies to all sensors of the same sensor production series. The velocity dependence of the correction factor assigns each of various possible transport velocities of the value document to one correction factor applicable for the respective transport velocity (its absolute value). The velocity dependence of the correction factor stored in the sensor can be stored in the correction device or in the evaluation device or in a storage area of the sensor. It can be formed by discrete value pairs, for example a table, or a mathematical function. The velocity dependence of the correction factor was/will be determined on the basis of the average velocity dependence of the luminescence parameter of a reference medium assigned to the value document to be verified, as explained hereinafter.

To correct the luminescence time constant of the value document to be verified with respect to the transport velocity, the correction device is configured to determine, on the basis of a velocity dependence of the correction factor stored in the sensor and by means of information made available to the sensor about the verification transport velocity, a correction factor, which applies for the verification transport velocity of the value document. To determine the correction factor, the correction factor applying to the verification transport velocity is searched out from the stored velocity dependence of the correction factor. If a verification transport velocity is used for which the velocity dependence of the correction factor does not explicitly specify a correction factor, two correction factors applicable for different other transport velocities can also be offset, for example interpolated or extrapolated, with one another to calculate the correction factor.

For verification transport velocities which differ (in absolute value), various values are determined here for the correction factor as a function of the absolute value of the verification transport velocity. However, independently of the transport direction or for both opposing transport directions of the value document relative to the sensor, the same velocity dependence of the correction factor K(v) is used for correcting the luminescence parameter determined for the value document. A specification of the absolute value of the verification transport velocity is sufficient as information about the verification transport velocity, while information about its sign or about the verification transport direction is not necessary.

The correction device is configured to correct the luminescence parameter determined by the sensor for the value document with the aid of the at least one correction factor applicable for the verification transport velocity of the value document, in order to determine a corrected luminescence parameter for the value document. To correct the luminescence parameter determined for the value document, the luminescence parameter determined for the value document is offset, for example, multiplied or divided, with the correction factor applicable for the verification transport velocity of the value document.

The corrected luminescence parameter can possibly additionally also be corrected by a further correction, for example, the above-mentioned sensor-individual correction, before or after the velocity correction according to the invention is carried out.

The sensor, in particular the evaluation device, is designed to verify the luminescence of the respective value document on the basis of the corrected luminescence parameter. The corrected luminescence parameter, which was subjected to the above-mentioned velocity correction, can be compared for this purpose to one or more reference value(s) or threshold(s) expected for the respective luminescent material of the value document. To verify the respective value document on the basis of the corrected luminescence parameter, however, a parameter derived from one or more corrected luminescence parameter(s) can also be used, for example, in case of a velocity correction by measurement time, a characteristic time constant determined from the intensity-time curve corrected by measurement time.

According to the invention, a velocity correction of the measured luminescence parameter is thus carried out as a function of the transport velocity of the value documents. In particular, the velocity correction is used to correct the luminescence parameter with respect to the shift—occurring similarly on all sensors of a sensor production series—of the excited area of the value document in relation to the detection area of the sensor, which is dependent on the transport velocity.

The luminescence parameters corrected using a velocity correction according to the invention, which are determined by various sensors of the same production series and/or the same sensor in various installation locations, can be compared directly to one another and/or to a specified target value of the luminescence parameter. In case of the comparison to the specified target value, a narrow acceptance range around the target value can be selected here—in contrast to the movement-related corrupted luminescence parameters, for which a relatively larger acceptance range around the target value has to be permitted. This results in a selective value document verification.

The luminescence parameter of the value document to be verified can be determined in the evaluation device of the sensor on the basis of the measured luminescence intensity/intensities of the value document to be verified and can be transmitted to the correction device, so that it carries out the velocity correction. The corrected luminescence parameter can subsequently be transmitted by the correction device to the evaluation device so that it carries out a verification of the value document on the basis of the corrected luminescence parameter. The correction device can be part of the evaluation device of the sensor. Alternatively, the correction device can also be provided in the sensor separately from the evaluation device.

The information about the verification transport velocity of the value document can be transmitted to the sensor from the value document processing device or determined by the sensor itself by measurement. It can be stored in the sensor. The velocity dependence of the correction factor can be stored in the sensor, for example, in a memory area of the correction device or in another memory of the sensor outside the correction device, for example, in the form of discrete value pairs or as a mathematical function, which assigns a correction factor to each of multiple transport velocities of a value document to be verified.

Determining the Speed Dependence of the Correction Factor

A reference sensor and a reference medium, which includes a reference luminescent material and is assigned to the value document to be verified, are used to determine the velocity dependence of the correction factor. The reference sensor is configured for measuring the luminescence of the reference medium and is assigned to the sensor, in which the velocity correction of the luminescence parameter is provided and which is to be used to verify the value documents. The reference sensor assigned to the sensor is in particular part of the same sensor production series as the sensor in which the velocity correction is provided. The reference sensor is preferably nominally identical (identical except for production tolerances) to that sensor in which the velocity correction is provided. The luminescence parameter of the reference medium corresponds here to the luminescence parameter of the value document or is identical thereto.

In order to determine the first and second velocity dependence of the luminescence parameter, using the reference sensor—for example, in preparation for the value document verification—the luminescence parameter of the reference medium as a function of the transport velocity is determined for the transport directions, which are directed opposite to one another, of the reference medium relative to the reference sensor. The first velocity dependence of the luminescence parameter applies to a first transport direction in which the reference media is transported past the reference sensor or the value document is transported past the sensor. The second velocity dependence of the luminescence parameter applies for the second transport direction, opposite to the first transport direction, in which the reference medium is transported past the reference sensor or the value document is transported past the sensor.

In particular the following steps are carried out to determine the velocity dependence of the correction factor:

a) determining a first velocity dependence $L+(v)$ of the luminescence parameter, corresponding to the luminescence parameter L of the value document, of a reference medium excitable to luminescence emission with the aid of the reference sensor for a first transport direction of the reference medium relative to the reference sensor, and b) determining a second velocity dependence $L-(v)$ of the luminescence parameter, corresponding to the luminescence parameter L of the value document, of the reference medium with the aid of the reference sensor for a second transport direction (−x), opposite to the first transport direction, of the reference medium relative to the reference sensor, and c) averaging the first velocity dependence $L+(v)$ of the luminescence parameter of the reference medium and the second velocity dependence $L-(v)$ of the luminescence parameter of the reference medium at the respective velocity v, in order to ascertain a mean velocity dependence $Lm(v)$ of the luminescence parameter of the reference medium, for example, by calculating a mean velocity dependence of the luminescence parameter $Lm(v)=(L+(v)+L-(v))/2$, and d) using the mean velocity dependence of the luminescence parameter $Lm(v)$ of the reference medium to determine a velocity dependence of a correction factor $K(v)$, which is suitable for correcting the luminescence parameter L of the value document to be verified. The luminescence parameter corrected in this case is the same luminescence parameter as the luminescence parameter measured on the reference medium, for example, a time constant or an intensity value. The velocity dependence of a correction factor $K(v)$ can, for example, be calculated directly from the mean velocity dependence of the luminescence parameter $Lm(v)$ or determined via a fitting curve $F(v)$ for the mean velocity dependence $Lm(v)$, e) storing the velocity dependence of the correction factor $K(v)$ in the sensor.

In order to determine the first and second velocity dependence of the luminescence parameter of the reference medium, a luminescence parameter of the reference medium is determined in each case using the reference sensor when this medium is transported past the reference sensor along both transport directions in each case at different transport velocities. In particular, the following steps are carried out for this purpose in steps a) and b):

transporting the reference medium excitable to luminescence emission past the reference sensor at various transport velocities along the first transport direction and at various transport velocities along the second transport direction, opposite to the first transport direction, of the reference medium relative to the reference sensor, and measuring in each case at least one luminescence intensity (e.g., luminescence intensity at one or more measurement times, time curve of the luminescence intensity, or integrated luminescence intensity) of the reference medium by means of the reference sensor for the various transport velocities and transport directions, while the reference medium is transported at the respective transport velocity along the respective transport direction past the reference sensor, and determining the first velocity dependence of the luminescence parameter L of the reference medium (for example, time constant or intensity value), corresponding to the luminescence parameter L of the value document, for the first transport direction of the reference medium relative to the reference sensor on the basis of the at least one luminescence intensity of the reference medium measured by the reference sensor for the first transport direction, and determining the second velocity dependence of the luminescence parameter L of the reference medium (for example, time constant or intensity value), corresponding to the luminescence parameter L of the value document, with the aid of the reference sensor for the second transport direction of the reference medium relative to the reference sensor on the basis of the at least one luminescence intensity of the reference medium measured by the reference sensor for the second transport direction.

For this purpose, a single reference medium can be used or multiple similar reference media can be used, the measured luminescence intensities of which are averaged to determine the first and second velocity dependence of the luminescence parameter of the reference medium. These reference media can be sheets provided with luminescent material, which are especially prepared for this purpose, or real value documents.

With the respective transport velocity and direction, precisely one luminescence intensity or multiple luminescence intensities of the reference medium can be measured at various measurement times and/or in various spectral channels. The measurement time relates here to the time of a pulsed luminescence excitation, for example, at its end.

The determination and storage of the velocity dependence of a correction factor K(v) is preferably carried out before delivery of the sensor at the sensor producer. This has the advantage that the sensor provided with the velocity correction can go into operation in various value document processing devices after delivery with little effort.

Since the velocity dependence of the respective luminescence parameter, which is determined alone for the first and second transport direction, deviates only slightly from the mean velocity dependence of the respective luminescence parameter averaged over the two transport directions, the latter can be used for both transport directions opposite to one another. That is to say, the actual transport direction of the value documents to be verified in the respective value document processing device or the installation location of the sensor in the respective value document processing device does not have to be taken into consideration for the velocity correction of the respective luminescence parameter. This facilitates putting the sensor into operation in various installation locations or in various value document processing devices.

In addition, the mean velocity dependence of the respective luminescence parameter, averaged over the two transport directions opposite to one another, is essentially identical for various sensors of the same sensor production series. That is to say, the mean velocity dependence of the luminescence parameter applies sensor-comprehensively for all sensors of the same sensor production series. For various sensors of the same sensor production series, the mean velocity dependence of the luminescence parameter Lm(v) of the reference medium can therefore be used to determine the respective velocity dependence of the correction factor K(v). The mean velocity dependence of the respective luminescence parameter of one of these sensors, which is declared as the reference sensor, is therefore used as a representative for all sensors of this sensor production series (which are nominally identical to the reference sensor, but de facto are slightly different) for the determination of the velocity dependence of the correction factor. It is therefore sufficient to determine the mean velocity dependence of the respective luminescence parameter on only one single reference sensor of the sensor production series, i.e., it is not necessary to determine the velocity dependence of the respective luminescence parameter for each individual sensor of the sensor production series.

Therefore, in multiple sensors of the same sensor production series, the same velocity dependence of the luminescence parameter of the reference medium is preferably used to determine the respective velocity dependence of the correction factor K(v). In particular, in multiple sensors of the same sensor production series, the same velocity correction is provided or the same velocity dependence of the correction factor K(v) is stored in the respective sensor. Alternatively, in various sensors of the same sensor production series, the velocity dependence of the correction factor K(v) stored in the sensor can be adapted individually by sensor, however, for example, the mean velocity dependence of the luminescence parameter can be offset with sensor-individual factors and can then become/be stored as the velocity dependence of the correction factor K(v) in the sensor.

The velocity correction according to the invention is exact for an ideal sensor of the respective sensor production series, which includes no offset between its illumination area and its detection area. However, the correction factor applying comprehensively to sensors also applies at least approximately for sensors of this sensor production series with deviating offset. In order to achieve an exact velocity correction with a large offset, it can be provided that the luminescence parameter determined for the value document is not only subjected to the velocity correction according to the invention, but is additionally also corrected with the aid of a sensor-individual correction factor applying for the verification transport velocity of the value document, in order to determine an even more accurately corrected luminescence parameter of the value document.

Examples of the Corrected Luminescence Parameters

Preferably, the same luminescence parameter is determined for the reference medium as for the value document. For example, the luminescence parameter of the reference medium is the decay time of the reference medium and the luminescence parameter of the value document is the decay time of the value document, or the luminescence parameter of the reference medium is a determined intensity value of the reference medium and the luminescence parameter of the value document is the corresponding determined intensity value of the value document.

In some exemplary embodiments, the luminescence parameter of the reference medium or the value document, which is determined for the reference medium or for the value document to be verified, respectively, for the respective transport velocity and direction, is ascertained in each case on the basis of luminescence intensities, measured at various measurement times, by the reference sensor on the reference medium or by the sensor on the value document to be verified. Various measurement times are understood as various measurement times with respect to the pulsed luminescence excitation, for example, various delay times with respect to the time of the excitation pulse of the pulsed excitation. That is to say, the luminescence parameter of the reference medium is ascertained on the basis of luminescence intensities which were measured by the reference sensor at various measurement times on the reference medium, and the luminescence parameter of the value document is ascertained on the basis of luminescence intensities which were measured by the sensor at various measurement times on the value document. This is the case, for example, if the time constant, the intensity ratio, or an averaged or integrated intensity is used as the luminescence parameter.

For example, the luminescence parameter of the reference medium or the value document to be verified is a summarized luminescence intensity (of the reference medium or the value document to be verified). This can be a luminescence intensity (of the reference medium or of the value document to be verified) integrated or averaged over various measurement times (of the reference sensor or the sensor). The luminescence parameter of the reference medium can be a luminescence intensity of the reference medium integrated or averaged over various measurement times of the reference sensor and the luminescence parameter of the value document to be examined can be a luminescence intensity of the value document to be examined and integrated or averaged over the corresponding various measurement times of the sensor.

The luminescence parameter (of the reference medium or the value document to be verified) can also be a luminescence time constant of the luminescence (of the reference medium or the value document to be verified) derived from a time curve of the measured luminescence intensities, in particular the buildup time or the decay time of the luminescence. The luminescence parameter of the reference medium is then a luminescence time constant, in particular the buildup time or decay time, of the luminescence of the reference medium, which is derived from a time curve of the luminescence intensities of the reference medium measured by the reference sensor. And the luminescence parameter of the value document to be verified is a corresponding luminescence time constant, in particular the buildup time or decay time, of the luminescence of the value document to be verified, which is derived from a time curve of the luminescence intensities of the value document measured by the sensor.

The luminescence parameter (of the reference medium or the value document to be verified) can also be a ratio of two of the measured luminescence intensities (of the reference medium or the value document to be verified), in particular the ratio of the luminescence intensities of two different measurement times or the ratio of the luminescence intensities of two different time intervals or the ratio of the luminescence intensities of the reference medium or the value document to be verified measured in two different spectral channels. The luminescence parameter of the reference medium is then a ratio of the luminescence intensities of two different measurement times of the reference sensor or the ratio of the luminescence intensities of the reference medium measured in two different spectral channels of the reference sensor. And the luminescence parameter of the value document to be verified is the corresponding ratio of the luminescence intensities of two different measurement times of the sensor or the corresponding ratio of the luminescence intensities of the value document measured in the two different spectral channels of the sensor.

The luminescence parameter (of the reference medium or the value document to be verified) can also be a luminescence intensity measured by the reference sensor on the reference medium or by the sensor on the value document at a discrete measurement time (measurement time defined with respect to the time of a pulsed luminescence excitation). The luminescence parameter of the reference medium is then a luminescence intensity measured by the reference sensor on the reference medium at a discrete measurement time (for example, with respect to the time of a pulsed luminescence excitation). And the luminescence parameter of the value document to be verified is a luminescence intensity measured by the sensor on the value document at the corresponding discrete measurement time (for example, with respect to the time of a pulsed luminescence excitation).

Correction by Measurement Time

In particular, the method can be carried out on the same reference medium and the same reference sensor and on the same sensor and the same value document for multiple different (different with respect to the time of the pulsed luminescence excitation) discrete measurement times. For the various discrete measurement times, in each case the luminescence intensity is measured (by the reference sensor on the reference medium or by the sensor on the value document) and the luminescence intensity measured at the respective measurement time (by the reference sensor on the reference medium or by the sensor on the value document) is used as the luminescence parameter. The reference sensor measures for each of various discrete measurement times a discrete luminescence intensity on the reference medium and the sensor measures for each of various discrete measurement times a discrete luminescence intensity on the value document. The corresponding discrete measurement times of the value document can be identical to the discrete measurement times of the reference medium or can at least approximately correspond thereto. However, they can also be different, since the equality of the discrete measurement times is not necessary, for example, for determining a time constant.

In a first variant of the correction by measurement time, the luminescence intensity measured at the respective measurement time (by the reference sensor on the reference medium or by the sensor on the value document) is used for each of various discrete measurement times as the luminescence parameter, wherein for each of the various discrete measurement times

- the first and the second velocity dependence of the luminescence intensity measured at the respective discrete measurement time is determined by the reference sensor on the reference medium for the respective discrete measurement time (as the first and second velocity dependence of the luminescence parameter of the reference medium according to steps a), b)), and
- by averaging this first and second velocity dependence, the respective mean velocity dependence of the respective luminescence intensity is ascertained for the respective discrete measurement time (as the mean velocity dependence of the luminescence parameter of the reference medium according to step c)), and
- (when determining the velocity dependence of the correction factor according to step d)) for the respective discrete measurement time, the respective mean velocity dependence of the respective luminescence intensity of the reference medium is used to determine a velocity dependence, individual by measurement time, of the correction factor (applicable for the respective measurement time), which is stored in the sensor (according to step e)) and is assigned there to the respective discrete measurement time.

The correction device is configured (when providing the velocity correction according to step f), for the velocity correction of luminescence intensities of the respective value document, which the sensor measures at corresponding measurement times on the value document, for the purpose of for each of the luminescence intensities measured at the corresponding measurement times by the sensor on the value document, in each case determining a correction factor individual by measurement time on the basis of the velocity dependence of the correction factor, individual by measurement time, stored in the sensor and by means of the information provided to the sensor about the verification transport velocity of the value document, which correction factor applies for the respective corresponding measurement time and for the verification transport velocity of the value document, and correcting the luminescence intensity measured on the value document at the corresponding measurement time with the aid of the correction factor, individual by measurement time, applicable for the respective corresponding measurement time and for the verification transport velocity of the value document, in order to determine a corrected luminescence intensity for the respective corresponding measurement time of the value document.

The sensor is designed for the purpose of using the corrected luminescence intensities, which were determined for the corresponding measurement times, for verifying the luminescence of the respective value document. In the verification of a value document, by means of multiple velocity dependencies of the correction factor individual by measurement time, which are stored in the sensor, multiple correction factors, which apply for the verification transport velocity of the value document and for the respective measurement time, are determined on the basis of the information about the verification transport velocity. And the luminescence intensity of the value document measured at the respective measurement time is corrected with the aid of the correction factor applicable for the verification transport velocity and for the respective measurement time, wherein various correction factors are used for the various measurement times.

The velocity dependence of the correction factor, individual by measurement time, stored for each one of the measurement times differs from the velocity dependencies of the correction factor, individual by measurement time, stored for the other measurement times. For example, a separate correction factor individual by measurement time and individual by transport velocity is stored in each case in the sensor for various measurement times and various transport velocities.

The correction factor of the respective measurement time applicable for the verification transport velocity of the value document is ascertained, for example, on the basis of a first velocity dependence of the first luminescence intensity of the respective measurement time determined in the preparation for the value document verification and a second velocity dependence of the second luminescence intensity of the respective measurement time determined in the preparation for the value document verification, which apply for transport directions of the value document relative to the sensor directed opposite to one another.

In a second variant of the correction by measurement time for each of the various discrete measurement times, the first and the second velocity dependence of the luminescence intensity measured at the respective discrete measurement time is determined by the reference sensor on the reference medium for the respective discrete measurement time (as the first and second velocity dependence of the luminescence parameter of the reference medium according to steps a), b)), and for each of the various discrete measurement times, by averaging this first and second velocity dependence, the respective mean velocity dependence of the respective luminescence intensity is ascertained for the respective discrete measurement time (as the mean velocity dependence of the luminescence parameter of the reference medium according to step c)), and on the basis of the mean velocity dependencies of the respective luminescence intensity, which were ascertained for the various discrete measurement times, a representative velocity dependence of the correction factor is determined by averaging over the various discrete measurement times, which applies or is used for multiple or all measurement times or which applies independently of the measurement time.

The representative velocity dependence of the luminescence intensity is used to determine (according to step d)) the velocity dependence of the correction factor (applicable for multiple or all measurement times), which correction factor is stored in the sensor ((according to step e)) (and is assigned therein to all discrete measurement times or multiple discrete measurement times of the value document). The velocity correction of the second variant is not as accurate as in the first variant, but is less complex than this.

For example, to ascertain the representative velocity dependence, the mean velocity dependencies of the respective luminescence intensity, which were ascertained for the various discrete measurement times, are combined by averaging to form a representative velocity dependence of the luminescence intensity, for example, by averaging over the mean velocity dependencies of the luminescence intensity applicable for various measurement times. Alternatively, for this purpose the first and second velocity dependencies of all measurement times can be combined or averaged. Alternatively, for this purpose in each case the luminescence intensities of the various discrete measurement times, which were measured at the same transport velocity, can be combined or averaged for various transport velocities. Alternatively, for this purpose firstly the velocity dependence of the correction factor can be determined for each of multiple measurement times and these can be combined or averaged.

The correction device is configured (when providing the velocity correction according to step f) for the velocity correction of luminescence intensity of the respective value document, which the sensor measures at multiple (arbitrary) measurement times on the value document (which can correspond to the discrete measurement times (t1, t2) of the reference medium or not), for each of the luminescence intensities measured by the sensor on the value document at the measurement times, in each case to determine by means of the representative velocity dependence of the correction factor stored in the sensor and by means of information about the verification transport velocity of the value document made available to the sensor, a representative correction factor which applies for the measurement times of the value document and for the verification transport velocity of the value document, and to correct the luminescence intensity measured on the value document at the respective measurement time with the aid of the representative correction factor applicable for the verification transport velocity of the value document, in order to determine a corrected luminescence intensity for the respective measurement time of the value document, wherein the luminescence intensities measured on the value document at the multiple measurement times are corrected in particular with the aid of the same representative correction factor applicable for the verification transport velocity.

The sensor is, for example, designed to use the corrected luminescence intensities, which were determined for the measurement times, for verifying the luminescence of the respective value document. For example, the sensor is configured, for the verification of the value document by means of the corrected luminescence intensities, which were determined for the measurement times of the value document, to determine a time constant of the luminescence of the value document and to verify the value document on the basis of the time constant.

In one refinement of the invention, at least two velocity dependencies K(v), K'(v) of the correction factor are determined by means of one or more different reference media and stored in the sensor, to which different value ranges of the luminescence parameter, for example, the luminescence time constant, of value documents to be verified are assigned, or which apply for various value ranges of the luminescence parameter, for example, the luminescence time constants, of value documents to be verified. The correction device will be/is then configured to determine the correction factor applicable for the verification transport velocity as a function of information made available to the sensor about a target value of the luminescence parameter, for example, the luminescence time constant, of the value document to be verified. The correction device will be/is then configured to select from these velocity dependencies as a function of information made available to the sensor about a target value of the luminescence parameter, for example, the luminescence time constant, of the value document to be verified, that velocity dependence of the correction factor in the value range of which this target value lies, and to use this for determining the correction factor applicable for the verification transport velocity. The velocity dependencies applicable for various value ranges of the luminescence parameter, for example, the luminescence time constant, can be determined, for example, by means of multiple reference media, the specified luminescence parameter of which, for example, luminescence time constant, lies in the respective value range, in particular by determining the luminescence parameter, for example, the reference medium time constant, of the various reference media in each case as a function of the transport velocity.

The invention also relates to a device for processing value documents which includes the above-described sensor. The device includes a transport device, which is configured to transport the respective value document to be verified past the sensor along a transport direction at a verification transport velocity. For example, the device is a sorting device for value documents.

The device can include a unit which is configured to determine the information about the verification transport velocity of the value document and which transmits its information about the verification transport velocity to the sensor and thus provides it thereto. This unit can be the control unit of the device, which shows the information about the verification transport velocity of the value document set on the device. The unit can also be, however, a velocity sensor for measuring the verification transport velocity of the value document and/or can use one or more light barriers for this purpose. Alternatively, the unit can also be the operator interface of the device, at which the verification transport velocity of the value documents can be set by an operator of the device. Alternatively, the verification transport velocity can also be ascertained by the sensor itself and thus made available, for example, by means of the photodetector and possibly an additional photodetector of the sensor positioned at a known distance thereto, which detect the time interval of one of the value document edges transported past.

The invention also relates to a method for verifying value documents by way of the sensor according to the invention, which the value documents are transported past for their verification along a transport direction at a verification transport velocity, having the following steps:

A) transporting a value document past the sensor at the verification transport velocity and measuring at least one luminescence intensity of the value document by means of the sensor while the value document is being transported past the sensor,
B) making available information about the verification transport velocity of the value document in the sensor, e.g., determining, possibly transmitting, and storing the information in the sensor,
C) determining a correction factor, which applies for the verification transport velocity of the value document, on the basis of the velocity dependence of the correction factor stored in the sensor and by means of the information made available to the sensor about the verification transport velocity,
D) determining a luminescence parameter of the value document at the verification transport velocity on the basis of the at least one luminescence intensity of the value document measured at the verification transport velocity,
E) correcting the luminescence intensity of the value document with the aid of the correction factor applicable for the verification transport velocity of the value document in order to determine a corrected luminescence parameter for the value document,
F) using the corrected luminescence parameter to verify the value document, in particular by comparing the corrected luminescence parameter to the reference value(s) or threshold(s) expected for the value document.

To verify the value document, for example, an intensity-time curve of the luminescence of the value document can be ascertained. In this case during the measurement of the luminescence of the value document by means of the sensor while the value document is being transported past the sensor in step A), the luminescence intensity I of the value document is measured at various measurement times T1, T2, . . . , in step D), multiple intensity parameters $I_{T1}(vP)$, $I_{T1}(vP)$, . . . of the luminescence of the value document at the verification transport velocity vP are determined on the basis of the luminescence intensities of the value document measured at the various measurement times, wherein, as the respective intensity parameter of the respective measurement time, the luminescence intensity measured at the respective measurement time is determined (for example, the first luminescence parameter is the luminescence intensity $I_{T1}(vP)$ measured at a first measurement time T1, the second luminescence intensity is the luminescence intensity $I_{T2}$(vP) measured at a second measurement time T2, . . . ), and in step F), the value document is verified on the basis of the corrected luminescence parameters, i.e., on the basis of the corrected luminescence intensities $I_{T1}$*(vP), $I_{T2}$*(vP), . . . , of the value document. To verify the value document in step F), from the corrected luminescence intensities $I_{T1}$*(vP), $I_{T2}$*(vP), . . . of the various measurement times T1, T2, . . . (or from the time curve of the corrected luminescence intensities $I_{T1}$*(vP), $I_{T2}$*(vP), . . . ), a corrected luminescence time constant τ (for example, build up time or decay time) is determined, which is characteristic for the time curve of the corrected luminescence intensity of the value document, and the value document is verified on the basis of the corrected luminescence time constant T.

The value documents to be verified are, for example, banknotes, checks, identification cards, credit cards, check cards, tickets, vouchers, etc.

BRIEF DESCRIPTION OF THE DRAWINGS

The invention is explained by way of example hereinafter on the basis of the following figures. In the figures.

DETAILED DESCRIPTION OF VARIOUS EMBODIMENTS

Figure 1:
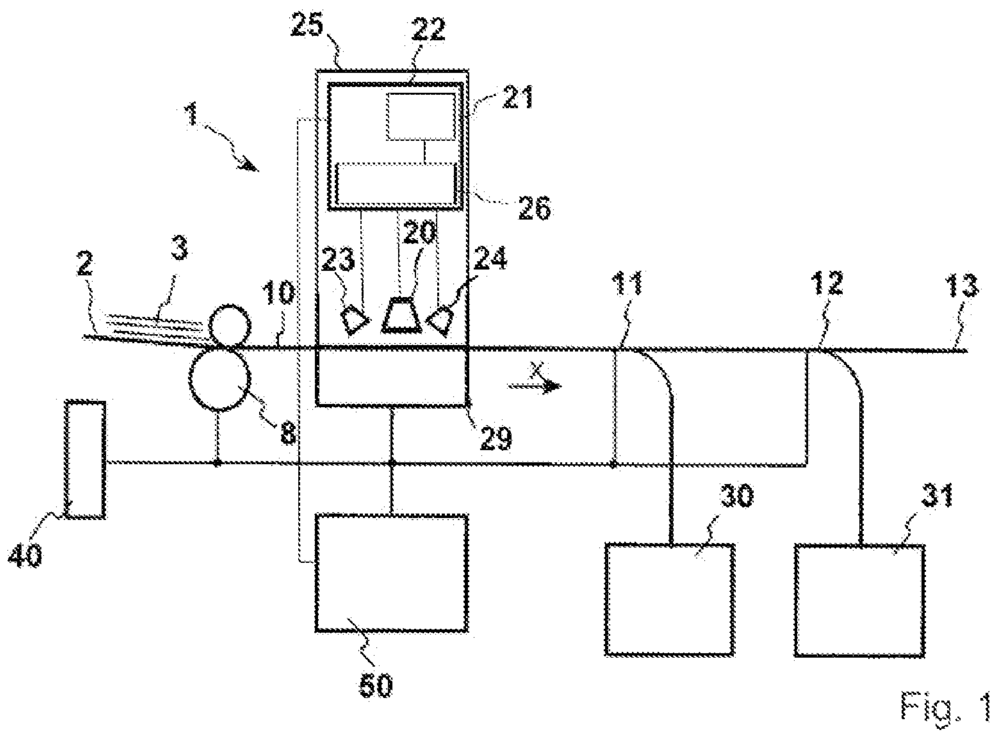
FIG. 1 shows a schematic structure of a value document processing device having the sensor.

FIG. 1 shows by way of example the schematic structure of a value document processing device 1 having an input tray 2, in which a stack of value documents 3 to be processed is provided, and an isolator 8, by which in succession in each case one (for example the respective uppermost or lowermost) value document of the input stack is acquired and transferred to a transport unit 10 (transport belts and/or transport rollers)—only schematically shown in the selected illustration—which transports the value documents in the transport direction +x past a sensor 25.

The sensor 25 is located in the value document processing device from FIG. 1, viewed along the transport direction +x, in a left installation location (above the transport path). In other value document processing devices, a sensor of this sensor production series can also be installed, however, in a right installation location (below the transport path). This case corresponds to a reversed transport direction of the value document relative to the sensor than in the case shown and is thus equivalent to a transport direction −x of the sensor 25 shown in FIG. 1. Therefore, for both possible transport directions +x and −x, a velocity correction is to be provided for the luminescence parameter of the value documents to be verified.

The sensor 25 comprises a photodetector 20 in the illustrated example, which includes at least one photosensitive element, which converts the luminescence intensities emitted by the value document, which has been transported past, into corresponding sensor signals. The photodetector 20 can also include multiple such photosensitive elements, for example, for various spectral components of the luminescence light. The sensor 25 can also be designed to verify the value documents 3 in one or more measurement tracks on the respective value document, wherein a photodetector 20 having one or more photosensitive elements is provided for each of the measurement tracks. The optical excitation of the luminescence feature of the value documents is carried out, for example, by means of excitation light sources 23, 24 arranged on both sides of the photodetector 20, which illuminate the value document in an illumination area using excitation light. The sensor 25—viewed in the transport direction x of the value documents—is arranged on the left side of the transport path. Another sensor 29 can be arranged opposite to the sensor 25, on the right side of the transport path.

The photodetector 20 is designed for measuring the luminescence of the value documents during or after the end of the optical excitation. For this purpose, the photodetector 20 is activated by a control unit of the sensor (not shown) such that it detects the luminescence of the respective value document 3 at one or more different measurement times. The intensity values detected from the measurement location of the value document to be verified, for example, from a security feature of the value document, are passed on by the photodetector to an evaluation unit 22 of the sensor. The evaluation unit 22 can be contained in the housing of the sensor 25 or outside thereof, for example, in a central evaluation unit of the value document processing device 1. The evaluation unit 22 determines the luminescence parameter L on the basis of the sensor signals detected at the measurement point(s) in time.

The velocity dependence of the correction factor K(v) is stored in a storage area 26 of the evaluation unit 22. A correction unit 21 of the evaluation unit 22 can access the information stored in the memory area 26 in order to use it for the velocity correction of the luminescence parameter. Further information can be stored in the memory area 26, such as information about the verification transport velocity vP of the value documents, which can be different depending on the type or setting of the value document processing device 1.

The evaluation unit 22 determines, from the intensity value(s) of the luminescence of the value documents detected at the measurement point(s) in time by the photo detector 20, for example, a luminescence parameter L of a security feature of the value documents and transfers this to the correction unit 21, which carries out the velocity correction according to the invention on the basis of the velocity dependence/dependencies K(v) of the luminescence parameter stored in the memory area 26 and by means of the information about the verification transport velocity of the value documents vP. For this purpose, the correction factor K(vP) associated with vP is searched out from K(v). If the verification transport velocity vP does not correspond concisely to one of the transport velocities v contained in the velocity dependence K(v) of the correction factor, the correction factor K(vP) applicable for vP can be determined by interpolation or extrapolation from K(v). The corrected luminescence parameter L*(vP) results from L(vP), for example, by multiplication with K(vP) (L*(vP)=L(vP)·K(vP)) or division by K(vP) (L*(vP)=L(vP)/K(vP)) and possibly multiplication or division with a further, in particular sensor-individual, factor. The luminescence parameter L*(vP) corrected by the correction unit 21 is then used by the evaluation unit 22 as a verification criterion for the value documents, in particular to judge the authenticity of the value documents.

Depending on the authenticity of the respective value document ascertained by the evaluation device 22, the switches 11 and 12 along the transport route are controlled by the control unit 50 such that the value document is transported into one of the output trays 30, 31 of the value document processing device 1. For example, value documents which have been recognized as authentic are deposited in a first output tray 30, while value documents classified as inauthentic or potentially counterfeit are deposited in a second output tray 31. At the end of the illustrated transport line (reference numeral 13), further output trays and/or other units can be provided, for example, for storing or for destroying value documents, e.g., cassettes for protected storage of the value documents or a shredder. If, for example, a value document could not be recognized, a special output tray can be provided for this, in which such value documents are deposited and or provided for special treatment, for example by an operator.

In the illustrated example, the value document processing device 1 furthermore comprises an input/output unit 40 for input of data and/or control commands by an operator, for example by means of a keyboard or a touchscreen, and output or display of data and/or information on the processing process, in particular on the value documents processed in each case.

Figure 2A:
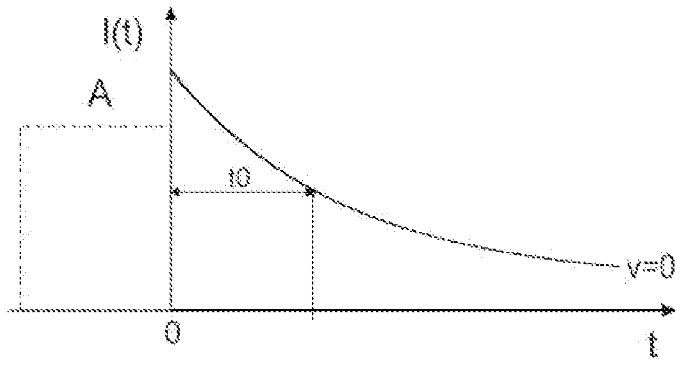
FIG. 2*a* shows an excitation pulse of the luminescence excitation and time curve of the luminescence intensity emitted by a value document in case of a static verification (v=0)
Figure 2B:
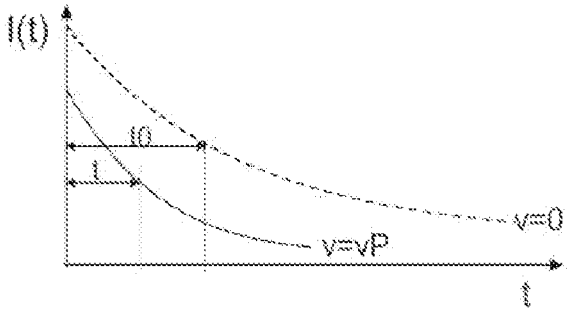
FIG. 2*b* shows a time curve of the luminescence intensity of the value document at a verification transport velocity vP in comparison to the static case (v=0)

The time behavior of the luminescence of a value document, which is emitted by a luminescence security feature of the value document, is shown in FIGS. 2*a* and 2*b*. FIG. 2*a* shows the intensity curve of the optical excitation pulse A, which is directed onto the value document for luminescence excitation and ends at the time t=0. The intensity curve I(t) of the luminescence then typically in each case has a buildup of the luminescence intensity (not shown) during the excitation pulse A of the luminescence excitation and a decay of the luminescence intensity after the end of the excitation pulse of the luminescence excitation.

FIG. 2*b* shows the intensity curve detected during a static measurement as a function of time after the end (t=0) of the excitation pulse A, i.e., when the value document is not moved relative to the detector (v=0). Such a static measurement is carried out for example in case of a manual verification of individual value documents. The detected luminescence intensity of the security feature decays in case of static measurement using the specified luminescence time constant t0 of the security feature. In the static measurement, the sensors 25*a*, 25*b* of the same sensor production series supply the same measurement result of the luminescence time constant t0.

If the same value document is transported past the sensor 25 during the machine verification in a value document processing device at a verification transport velocity vP, its photodetector 20 detects the intensity curve designated in FIG. 2*b* with v=vP as a function of the time after the end (t=0) of the excitation pulse A emitted by the excitation light sources 23, 24. For comparison, the intensity curve detected in the static case having the decay time t0 is also shown by dashed lines in FIG. 2*b*. The decay time t, which results from the intensity curve detected at the verification transport velocity v=vP is significantly shorter than the decay time t0 of the static measurement.

The relative movement of the value document relative to the sensor 25 causes a shorter decay time t to be determined than in the static case. This results because the value documents are moved further during the detection by a certain length, which is comparable to the size of the detection area and the illumination area. Therefore, the area excited on the value document moves during the measurement relative to the detector, and the measured intensity curve at the detector corresponds to a convolution from the time behavior of the luminescent material and the movement-related change of the overlap between the excited area on the value document and the detection area.

Determination of the Velocity Dependence of the Correction Factor K(v)

The determination of the velocity dependence K(v) of the correction factor, which applies for the respective luminescence parameter L, is typically carried out on the reference sensor before the delivery of the sensors by the sensor producer, for example, at a measurement location suitable for this purpose for the reference sensor or when it is installed in a value document processing device. In order to determine the velocity dependence of the correction factor K(v), the luminescence parameter L of a reference medium is determined at various transport velocities v with the aid of a reference sensor, which belongs to the same sensor production series as those sensors in which the velocity correction according to the invention is provided.

First, the velocity dependence of that luminescence parameter L is determined by the reference sensor on the reference medium, on the basis of which the sensors used to verify the value documents are to verify the value documents to be verified. The reference medium is provided with a reference luminescent material and is, for example, in the form of sheets.

To determine the velocity dependence of the luminescence parameter L of the reference medium by means of the reference sensor, the reference medium is transported at various transport velocities v1, v2, v3, . . . along the first transport direction (+x) past the reference sensor and in each case at least one first luminescence intensity of the reference medium is measured by means of the reference sensor, while the reference medium is transported at the respective transport velocity along the first transport direction past the reference sensor. Subsequently, the reference medium is transported at various transport velocities v1, v2, v3, . . . along the opposite second transport direction (−x) past the reference sensor and in each case at least one second luminescence intensity of the reference medium is measured by means of the reference sensor, while the reference medium is transported at the respective transport velocity along the second transport direction past the reference sensor. The luminescence intensity is measured in each case here at one or more discrete measurement times, for example, to determine the temporal change of the luminescence in each case for each transport velocity and direction or is measured in each case integrated over a time interval, for example, to determine the intensity integrated over time for each transport velocity and direction.

The respective measured luminescence intensity itself can be used as the luminescence parameter L of the reference medium with the respective transport velocity and direction, for example, the luminescence intensity of the reference medium measured at a discrete measurement time or integrated over a time interval. Alternatively, the luminescence parameter L of the reference medium with the respective transport velocity and direction can also be ascertained from multiple respectively measured luminescence intensities, such as the time constant from the time curve of the luminescence intensities or the ratio or the mean value of the luminescence intensities measured at multiple discrete measurement times on the value document.

On the basis of the at least one luminescence intensity of the reference medium measured in each case by the reference sensor for the various transport velocities along the first and second transport direction, for each transport velocity and direction, in each case a velocity dependence L(v) of the luminescence parameter L of the reference medium is determined and the velocity dependence of the correction factor K(v) is ascertained therefrom. This velocity dependence of the correction factor K(v) is stored in the individual sensors to which the reference sensor is assigned. The sensors having the velocity dependence of the correction factor K(v) stored therein are then used for the value document verification in value document processing devices.

To determine the velocity dependence of the correction factor K(v), a mean velocity dependence Lm(v) of the luminescence parameter is ascertained, which is ascertained by averaging of the first velocity dependence of the luminescence parameter applicable for the first transport direction and the second velocity dependence of the luminescence parameter applicable for the opposite second transport direction. From the mean velocity dependence Lm(v) of the luminescence parameter, the velocity dependence of the correction factor K(v) is then ascertained.

In order to determine the velocity dependence of the correction factor K(v) on the basis of the mean velocity dependence of the luminescence parameter Lm(v) of the reference medium, the mean velocity dependence of the luminescence parameter Lm(v) or its reciprocal is offset (multiplied or divided), for example, with a factor: K(v)=S/Lm(v) or K(v)=Lm(v)/S with S as a scaling factor. Alternatively, the mean velocity dependence of the luminescence parameter Lm(v) can be fitted by a fitting curve and the velocity dependence of the correction factor K(v) can be calculated from the fitting curve, wherein similarly the fitting curve itself or the reciprocal of the fitting curve can be offset (multiplied or divided) with a factor.

EXEMPLARY EMBODIMENTS

In the first and second exemplary embodiment, a luminescence parameter L is derived from the measured intensities of the luminescence of the value document, for example, from a measured intensity-time curve, and this is subsequently corrected in the manner according to the invention. The luminescence parameter L corrected here is, for example, an intensity integrated over a time interval, as in the first exemplary embodiment, or a parameter for the time behavior (for example, build-up time or decay time), as in the second exemplary embodiment, or an intensity averaged over multiple measurement times of the measured intensity-time curve or their ratio. This first type of the velocity correction is connected to relatively little computing effort and can therefore be executed quickly.

In the third and fourth exemplary embodiment, an intensity-time curve measured on a value document is corrected measurement point by measurement point and the value document is verified on the basis of the corrected intensity-time curve, for example, by determining a time constant or a parameter for the intensity from the corrected intensity-time curve. The correction factor is dependent in this case either only on the velocity (fourth exemplary embodiment) or on velocity and measurement time (third exemplary embodiment). The corrected luminescence parameter is then in each case the intensity value measured at a specific measurement time (=measurement point of the intensity-time curve), wherein preferably multiple intensity values measured at various times are each corrected in the manner according to the invention. This second type of the velocity correction (correction by measurement point) has the advantage that more complex evaluations, for example of the time behavior, are thus possible.

First Exemplary Embodiment

In the first exemplary embodiment, the luminescence intensity I integrated over a specific time interval is viewed as the luminescence parameter L.

Figure 3A:
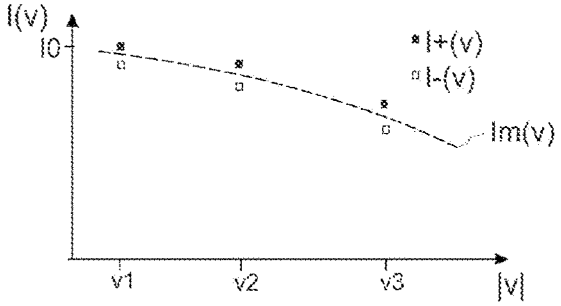
FIGS. 3*a-c* show a velocity dependence of the luminescence parameter "integrated luminescence intensity" of a reference medium for the two transport directions and mean velocity dependence of the integrated luminescence intensity determined therefrom in each case for a first sensor (Im(v), FIG. 3*a*) and for a second sensor (I'm(v), FIG. 3*b*) and velocity dependence K(v) of the correction factor determined from Im(v) or I'm(v), respectively (FIG. 3*c*)

Using the reference sensor, at various transport velocities v1, v2, v3 along the first transport direction (+x) in each case a first integrated luminescence intensity I+(v1), I+(v2), I+(v3) of the reference medium is measured, cf. FIG. 3*a*. Subsequently, using the reference sensor, at various transport velocities v1, v2, v3 along the second transport direction (−x) opposite thereto, the second integrated luminescence intensity I−(v1), I−(v2), I−(v3) of the reference medium is measured, cf. FIG. 3*a*. In FIG. 3*a*, the velocity dependencies I+(v), I−(v) of the integrated luminescence intensity I of the reference medium for the two transport directions (+x, −x) and the mean velocity dependence Im(v) of the integrated luminescence intensity determined therefrom are shown. The mean velocity dependence of the integrated luminescence intensity is calculated, for example, by means of the formula Im(v)=(I+(v)+I−(v))/2.

For comparison, the same measurements were carried out on the same reference medium by means of a value document sensor assigned to the reference sensor, which is to be used for the value document verification and is nominally identical to the reference sensor. For the normally identical value document sensor, the velocity dependencies I'+(v), I'−(v) of the integrated luminescence intensity of the reference media for the two transport directions (+x, −x) and the mean velocity dependence I'm(v) of the integrated luminescence intensity determined therefrom, as shown in FIG. 3*b*, result.

Figure 3B:
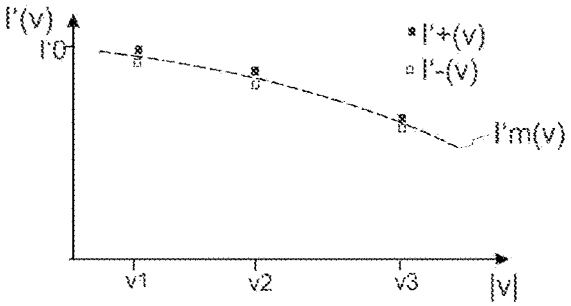

As the comparison of FIG. 3*b* to FIG. 3*a* shows, the integrated intensities measured by the value document sensor differ somewhat from the integrated intensities measured by the reference sensor. This is attributed to production-related tolerances, which the value document sensor and the reference sensor have—in spite of their nominal structural identity—for example, in the form of a slightly different offset between illumination area and detection area. However, the mean velocity dependencies, averaged over the two transport directions +x, −x, of the integrated luminescence intensity of the reference sensor Im(v) and the value document sensor I'm(v) are essentially identical (solid curves in FIGS. 3*a* and 3*b*). The mean velocity dependence of the integrated luminescence intensity Im(v), which was determined on the basis of the reference sensor, can therefore be used as representative for the value document sensors nominally identical thereto.

Figure 3C:
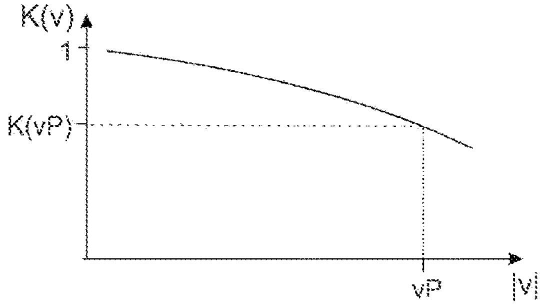

From the mean velocity dependence of the integrated luminescence intensity Im(v), which was determined on the basis of the reference sensor, the velocity dependence K(v) of the correction factor usable for the integrated luminescence intensity is then ascertained and stored in the respective sensor provided for the value document verification, cf. FIG. 3*c*.

For example, the mean velocity dependence K(v) of the correction factor is determined by means of the formula $$K(v)=S/\mathrm{Im}(v)=2\cdot S/(I+(v)+I-(v)),$$

with S as the scaling factor, i.e., the reciprocal of the mean integrated luminescence intensity Im(v) determines the respective correction factor. For example, the intensity I0=Im(v=0) of the reference medium during a static measurement by means of the reference sensor is used as the scaling factor. The velocity correction in the respective sensor is then configured so that during the value document verification, a multiplicative correction of the measured integrated intensity I(vP) of the luminescence of the value document is carried out:

$$I^*(vP)=I(vP)\cdot K(vP). \quad (1)$$

Alternatively, the mean velocity dependence K(v) of the correction factor can be determined by means of the formula $$K(v)=\mathrm{Im}(v)/S=(I+(v)+I-(v))/2\cdot S$$

with S as the scaling factor, i.e., the (possibly scaled) integrated intensity Im(v) directly determines the correction factor K(v), cf. FIG. 3*c*. For example, the intensity I0=Im (v=0) of the reference medium during a static measurement by means of the reference sensor is used as the scaling factor S. The velocity correction in the respective sensor is then configured so that during the value document verification, a corresponding different correction formula (with division by the correction factor K(vP)) is used:

$$I^*(vP)=I(vP)/K(vP) \quad (2)$$

If no mathematical function was determined for the mean velocity dependence Im(v) of the integrated intensity, but only discrete values, the mean velocity dependence of the correction factor K(v) can be ascertained from the mean velocity dependence Im(v) of the integrated intensity via a fitting curve. For this purpose, first a fitting curve F(v) is ascertained for the discrete function Im(v) and then the velocity dependence of the correction factor K(v) is ascertained from the velocity dependence of the fitting curve F(v): K(v)=S/F(v) or K(v)=F(v)/S.

After the delivery of the sensor from the sensor producer to the customer, value documents are verified using the sensor in a value document processing device 1. To verify the value documents, they are transported past the sensor at a verification transport velocity vP. For the velocity correction of the luminescence time constant, the correction device 21 uses information about the verification transport velocity vP of the value documents to be verified, which is transmitted to the sensor 25 from the control unit 50 of the value document processing device 1. During the value document verification, the correction factor K(vP) is then searched out from the velocity dependence of the correction factor K(v) stored in the sensor, which is assigned to the verification transport velocity of the value document vP, cf. FIG. 3*c*.

If a correction factor K(vP) is not explicitly stored in the sensor for the verification transport velocity vP of the respective value document processing device 1, for example, it can be searched out which of the stored transport velocities deviates least from the verification transport velocity vP of the value documents. The correction factor K(vP) assigned to this transport velocity is then used to correct the integrated luminescence intensity. This can be carried out under the proviso that the velocity deviation is below a defined threshold, for example <10%.

However, if the verification transport velocity vP of the value documents deviates more than is acceptable from all transport velocities v1, v2, v3, . . . stored in the sensor, at least two transport velocities v1, v2 are searched out from the transport velocities stored in the sensor, for example, those deviating least from the verification transport velocity vP, and the two correction factors K(v1), K(v2) assigned thereto. The correction factor K(vP) applicable for the verification transport velocity vP is determined from the at least two correction factors K(v1), K(v2) searched out, for example, by interpolation.

For the velocity correction, from the measured integrated intensity I(vP) of the luminescence of the value document, the corrected integrated intensity I*(vP) is calculated with K(vP) according to above formula (1) or (2). For an authenticity verification of the value document, the integrated intensity I*(vP) thus corrected is compared to a reference value, and the value document is classified as authentic or potentially counterfeit as a function thereof.

Second Exemplary Embodiment

In the second exemplary embodiment, a luminescence time constant, for example, the decay time or buildup time of the luminescence, is viewed as the luminescence parameter L.

In this case, to determine the velocity dependence K(v) of the correction factor, a reference medium is used, the reference luminescent material of which has a specified luminescence time constant matching with the value document to be verified. The target value of the luminescence time constant of the value document to be verified by the sensor preferably deviates from the specified luminescence time constant of the reference luminescent material of the reference medium by at most 50%, preferably by at most 30%, in order to achieve the most accurate possible velocity correction. For example, the luminescence time constant of the value document to be verified by the sensor at least approximately corresponds to the specified luminescence time constant of the reference medium. A very accurate velocity correction is thus achieved.

For example, for value document luminescent materials having a time constant between 60 μs and 160 μs, a reference luminescent material having a time constant of 100 μs is used for the reference medium, for value document luminescent materials having a time constant between 160 μs and 350 μs, a reference luminescent material having a time constant of 250 μs is used, and for value document luminescent materials having a time constant between 350 μs and 5 ms, a reference luminescent material having a time constant of 900 μs is used. Alternatively, for value document luminescent materials having a time constant between 100 μs and 5 ms, a reference luminescent material having a time constant of 250 μs can also be used. For example, to determine the velocity dependence K(v) of the correction factor of the respective sensor, a reference medium is used which includes the same luminescent material as the value documents to be verified using the respective sensor, i.e., the reference luminescent material and the value document luminescent material are identical.

Figure 4A:
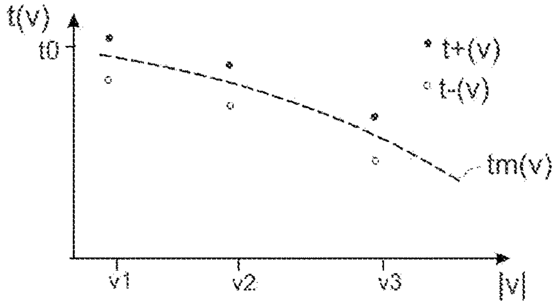
FIGS. 4*a-c* show the velocity dependence of the luminescence parameter "time constant" t of a reference medium for the two transport directions and mean velocity dependence of the time constant determined therefrom in each case for a first sensor (tm(v), FIG. 4*a*) and for a second sensor (t'm(v), FIG. 4*b*) and velocity dependence K(v) of the correction factor determined from tm(v) or t'm(v), respectively (FIG. 4*c*)

Similarly to the first exemplary embodiment, using the reference sensor at the various transport velocities v1, v2, v3, in each case a first luminescence time constant t+(v1), t+(v2), t+(v3) of the reference medium is measured along the first transport direction (+x) and a second luminescence time constant t−(v1), t−(v2), t−(v3) of the reference medium is measured along the opposite second transport direction (−x), cf. FIG. 4*a*. In FIG. 4*a*, the velocity dependencies t+(v), t−(v) of the luminescence time constant t of the reference medium for the two transport directions (+x, −x) and the mean velocity dependence tm(v) of the luminescence time constant determined therefrom are shown. The mean velocity dependence of the luminescence time constant is calculated, for example, by means of the formula tm(v)=(t+(v)+t−(v))/2.

Figure 4B:
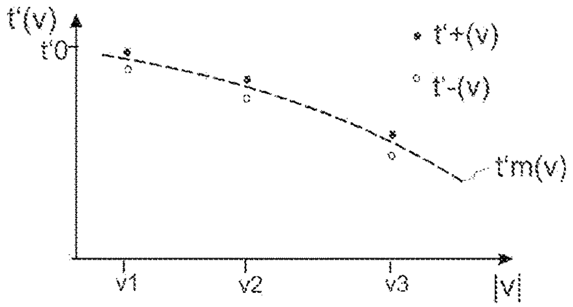

For the above-mentioned nominally identical value document sensor, the velocity dependencies t'+(v), t'−(v) of the luminescence time constant of the reference medium for the two transport directions (+x, −x) shown in FIG. 4*b* and the mean velocity dependence t'm(v) of the luminescence time constant of the reference medium determined therefrom result.

The luminescence time constants measured by the value document sensor also differ here somewhat due to the production-related tolerances from the luminescence time constants measured by the reference sensor. However, the mean velocity dependencies of the luminescence time constant of the reference sensor tm(v) and the value document sensor t'm(v) averaged over the two transport directions are essentially identical (solid curves in FIGS. 4*a* and 4*b*). The mean velocity dependence of the luminescence time constant tm(v), which was determined on the basis of the reference sensor, is therefore used representatively for the value document sensors nominally identical thereto.

Figure 4C:
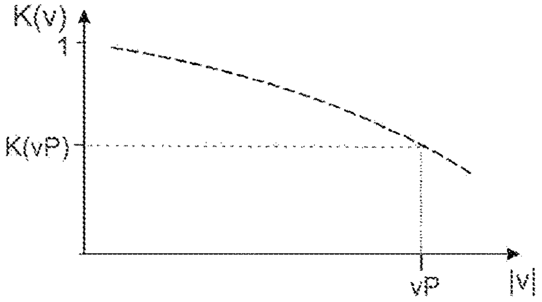

From the mean velocity dependence of the luminescence time constant tm(v), which was determined on the basis of the reference sensor, the velocity dependence K(v) of the correction factor usable for the luminescence time constant is then ascertained and stored in the respective sensor provided for the value document verification, cf., FIG. 4*c*.

In the value document verification, the sensor then searches out, on the basis of the information about the verification transport velocity vP, the correction factor K(vP) from the velocity dependence of the correction factor K(v) which is assigned to the verification transport velocity of the value document vP, cf. FIG. 4*c*. If the velocity dependence of the correction factor K(v) is only stored in the form of discrete values K(v1), K(v2), . . . in the sensor, the correction factor K(vP) applicable for the verification transport velocity vP of the value document can also be calculated by interpolation or extrapolation from these discrete values K(v1), K(v2), . . . .

For the velocity correction, from the measured luminescence time constant t(vP) of the value document, the corrected luminescence time constant t*(vP) is then calculated using K(vP). If, for example, the reciprocal of the mean luminescence time constant tm(v) was used for the correction factor (K(v)=S/tm(v)=2·S/(t+(v)+t−(v)), a multiplicative correction is carried out t*(vP)=t(vP)·K(vP)— similarly to above formula (1).

For an authenticity verification of the value document, the luminescence time constant t*(vP) thus corrected is compared, for example, to a reference value and the value document is classified in dependence thereon as authentic or potentially counterfeit.

In addition—similarly to the mean velocity dependence of the time constant tm(v)—using the reference sensor on at least one other reference medium having a different luminescence time constant, at least one further mean velocity dependence of the time constant $t^{\#}m(v)$ can be ascertained, which applies for value documents having a different target value of the luminescence time constant. Based thereon—in addition to the velocity dependence of the correction factor K(v) indicated above—one or more further velocity dependencies $K^{\#}(v)$ of the correction factor can also be ascertained and stored in the sensor, which each apply for another value range of the luminescence time constant of the value documents to be verified. In the value document verification, for the velocity correction, the respective velocity dependence of the correction factor K(v), $K^{\#}(v)$ is then used, which applies for the luminescence time constant of the respective value document to be verified, i.e., as a function of the luminescence time constant expected for the value document, the measured luminescence time constant is corrected either using K(vP) or using $K^{\#}(vP)$.

Third Exemplary Embodiment

In the third exemplary embodiment, a correction by measurement point of the intensity-time curve is carried out. For each measurement time t1, t2, . . . , a separate velocity dependence of the correction factor is stored in the sensor, for example, the velocity dependence of the correction factor $K_{t1}(v)$ for the measurement time t1, the velocity dependence of the correction factor $K_{t2}(v)$ for the measurement time t2, . . . .

Figure 5A:
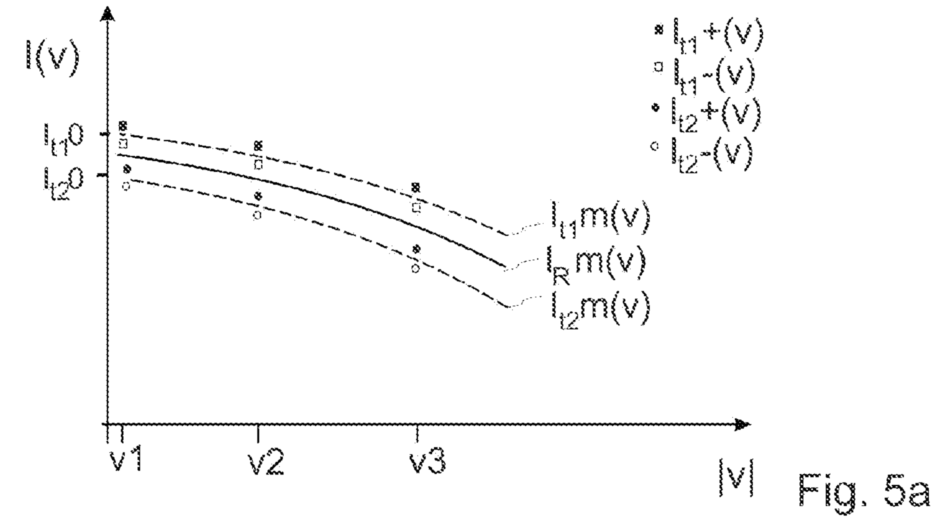
FIG. 5*a* shows the velocity dependence of the luminescence parameters "luminescence intensity at the time t1" and "luminescence intensity at the time t2" of a reference medium in each case for the two transport directions and respective mean velocity dependencies of the luminescence intensity $I_{t1}$m(v) and $I_{t2}$m(v) determined therefrom and representative velocity dependence $I_R$m(v)

To determine the velocity dependencies of the correction factor $K_{t1}(v)$, $K_{t2}(v)$, . . . —similarly to the first and second exemplary embodiment—using the reference sensor at various transport velocities v1, v2, v3 of the reference medium along the first transport direction (+x), in each case a first luminescence intensity $I_{t1}$+(v1), $I_{t1}$+(v2), $I_{t1}$+(v3) of the reference medium is measured for a first measurement time t1 after the end of the luminescence excitation and a further first luminescence intensity $I_{t2}$+(v1), $I_{t2}$+(v2), $I_{t2}$+(v3) of the reference medium is measured for a second measurement time t2 after the end of the luminescence excitation (and the same possibly also for further measurement times t3, t4, . . . and/or further transport velocities v4, v5, . . . ), cf. FIG. 5*a*. Then, using the reference sensor at the various transport velocities v1, v2, v3 of the reference medium along the opposite second transport direction (−x), a second luminescence intensity $I_{t1}$−(v1), $I_{t1}$−(v2), $I_{t1}$−(v3) of the reference medium is measured for the first measurement time t1 and a further second luminescence intensity $I_{t2}$−(v1), $I_{t2}$−

(v2), $I_{t2}$−(v3) of the reference medium is measured for the second measurement time t2 (and the same possibly also for further measurement times t3, t4, . . . and/or further transport velocities v4, v5, . . . ), cf. FIG. 5a. In FIG. 5a, the velocity dependencies $I_{t1}$+(v), $I_{t1}$−(v), $I_{t2}$+(v), $I_{t2}$−(v) of the respective measured luminescence intensity of the reference medium thus determined are shown for the two transport directions (+x, −x) and for the two measurement times t1, t2 and in each case the mean velocity dependence $I_{t1}$m(v) and $I_{t2}$m(v) of the luminescence intensity determined therefrom are shown for the two measurement times t1, t2 of the intensity-time curve.

Figure 5B:
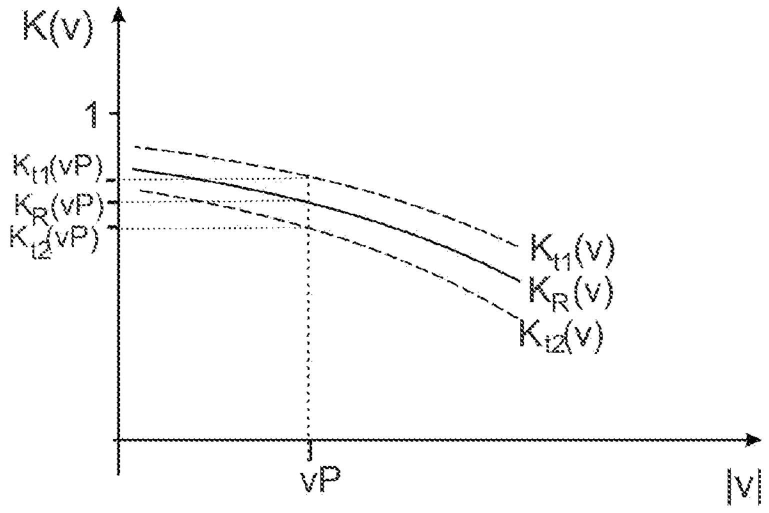
FIG. 5*b* shows velocity dependencies $K_{t1}$(v) and $K_{t2}$(v) of the correction factor determined from the respective mean velocity dependence $I_{t1}$m(v) or $I_{t2}$m(v) for the luminescence intensity at the time t1 and for the luminescence intensity at the time t2 and representative velocity dependence $K_R$(v) of the correction factor.

A separate velocity dependence of the correction factor is then determined for each measurement time t1, t2, . . . : the velocity dependence of the correction factor $K_{t1}$(v) for the measurement time t1, the velocity dependence of the correction factor $K_{t2}$(v) for the measurement time t2 (and the same possibly also for further measurement times t3, t4, . . . ). These velocity dependencies of the correction factor $K_{t1}$(v), $K_{t2}$(v), . . . are then stored in the respective sensor provided for the value document verification, cf. FIG. 5b.

The velocity dependence of the correction factor can be stored, for example, in the form of one or more matrix-type tables K(v,t), with numeric values in each case for K(v1, t1), K(v1, t2), . . . .

K(v2, t1), K(v2, t2), . . . .

However, the velocity dependence of the correction factor can also be stored in the form of mathematical functions $K_{t1}$(v), $K_{t2}$(v), . . . as a function of the transport velocity v for various measurement times t1, t2, . . . or can be stored in the form of mathematical functions $K_{v1}$(t), $K_{v2}$(t), . . . as a function of the measurement time t for various transport velocities v1, v2, . . . , which are each determined by means of a fitting function, for example.

In the value document verification, the value document sensor detects in each case the luminescence intensity of the value document, for example, at those measurement times T1, T2 after the end of the luminescence excitation which correspond to the discrete measurement times t1, t2 of the reference sensor during the measurement of the reference medium, for each of which a velocity dependence of the correction factor $K_{t1}$(v), $K_{t2}$(v) is stored in the sensor. If the measurement times T1, T2 of the value document deviate from the measurement times t1, t2 of the reference medium, the corresponding velocity dependencies of the correction factor $K_{T1}$(v), $K_{T2}$(v) can be extrapolated or interpolated from those stored $K_{t1}$(v), $K_{t2}$(v) and possibly stored in the sensor.

It is assumed hereinafter that the measurement times of the value document and the measurement time t1, t2 of the reference medium are at least approximately equal. As the velocity dependencies of the correction factor $K_{T1}$(v), $K_{T2}$(v), the velocity dependencies of the correction factor $K_{t1}$(v), $K_{t2}$(v) are then simply used. In the value document verification, the correction factors $K_{T1}$(vP)=$K_{t1}$(vP), and $K_{T2}$(vP)=$K_{t2}$(vP) are ascertained by the sensor on the basis of the information about the verification transport velocity vP, which apply for the measurement times T1, T2 of the value document and for the verification transport velocity vP, cf. FIG. 5b. The luminescence intensity $I_{T1}$(vP) detected from the value document to be verified at the measurement time T1 is corrected using the correction factor $K_{T1}$(vP), the luminescence intensity $I_{T2}$(vP) detected at the measurement time T2 is corrected using the correction factor $K_{T2}$(vP). The corrected intensity values $I_{T1}$*(vP)=$I_{T1}$(vP)·$K_{T1}$(vP) for the first measurement time T1 of the value document and $I_{T2}$*(vP)=$I_{T2}$(vP)·$K_{T2}$(vP) for the second measurement time T2 of the value document result therefrom, cf. FIG. 5c.

On the basis of the corrected luminescence intensities $I_{T1}$*(vP), $I_{T2}$*(vP), the luminescence of the value document can then be verified. For an authenticity verification of the value document, the corrected luminescence intensities $I_{T1}$*(vP), $I_{T2}$*(vP) can, for example, be set in a ratio to one another and compared to a reference value, and the value document can be classified as authentic or as potentially counterfeit as a function thereof.

Figure 5C:
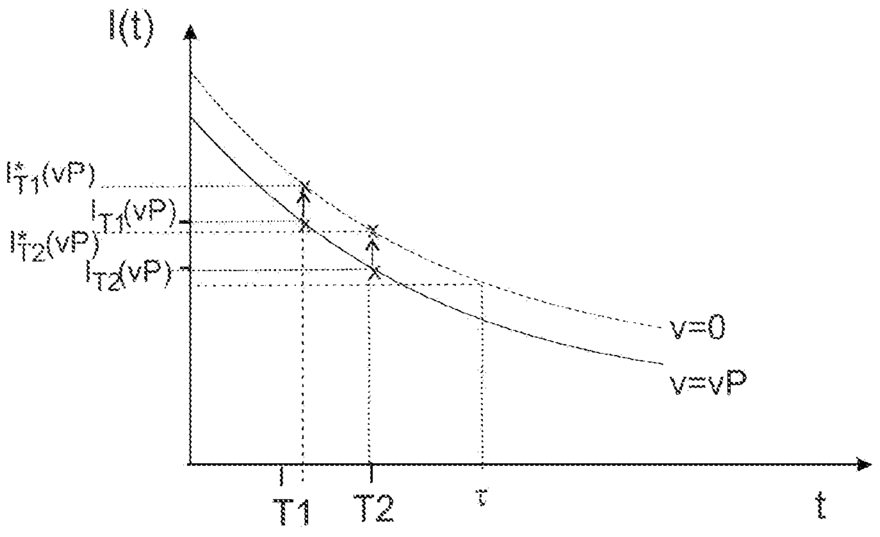
FIG. 5*c* shows the correction by measurement time of the time curve of the luminescence intensity of the value document for a verification transport velocity v=vP.

However, from the discrete corrected intensity values $I_{T1}$*(vP), $I_{T2}$*(vP)—and possibly further corrected intensity values $I_{T3}$*(vP), $I_{T4}$*(vP), . . . —a corrected intensity-time curve of the luminescence of the value document can also be ascertained, which corresponds to a static measurement of the luminescence of the value document, cf. FIG. 5c. On the basis of this corrected intensity-time curve, the luminescence of the value document can then be checked. For example, for this purpose a decay time τ of the corrected luminescence-time curve is determined and compared to a decay time specified for the value document or to thresholds specified for this purpose, cf. FIG. 5c.

Fourth Exemplary Embodiment

A correction of the intensity-time curve by measurement point is also carried out in the fourth exemplary embodiment. However, in contrast to the third exemplary embodiment—independently of the measurement time—only a single velocity dependence of the correction factor K(v)=$K_R$(v) is used for correcting the luminescence parameter of the value document. The intensity values of the luminescence of the value document measured at various measurement times are thus all corrected using the same factor $K_R$(vP).

Proceeding from the mean velocity dependencies $I_{t1}$m(v) and $I_{t2}$m(v) of the luminescence intensity for the various measurement times t1, t2 (and possibly mean velocity dependencies for further measurement times—cf. third exemplary embodiment), by averaging over the various discrete measurement times, a representative velocity dependence $K_R$(v) of the correction factor is determined which applies for all measurement times.

For example, for this purpose the mean velocity dependencies $I_{t1}$m(v), $I_{t2}$m(v), . . . of the respective luminescence intensity applicable for the various discrete measurement times t1, t2, . . . are combined by averaging to form a representative velocity dependence $I_R$m(v) of the luminescence intensity, which applies independently of the measurement time for the reference medium, cf. FIG. 5a. Then, from the representative velocity dependence $I_R$m(v) of the luminescence intensity, the representative velocity dependence $K_R$(v) of the correction factor (applicable for all measurement times) is determined, for example, on the basis of the formula $K(v)=K_R(v)=S/I_Rm(v)=2S/(I_{t1}(v)+I_{t2}(v))$ with S as the scaling factor. The representative velocity dependence $K_R$(v) of the correction factor is then stored in the sensor and the sensor is configured so that in the velocity correction for all discrete measurement times T1, T2 of the value document, the representative velocity dependence $K_R$(v) is used.

Alternatively to the calculation over $I_R$m(v), for the individual measurement times t1, t2, the velocity dependence $K_{t1}$(v), $K_{t2}$(v) of the correction factor could also be determined first in each case and only then can these be averaged: $K_R(v)=(K_{t1}(v), +K_{t2}(v))/2$.

The luminescence intensities $I_{T1}$(vP), $I_{T2}$(vP), which the respective sensor measures from a value document at its measurement times T1, T2 are then corrected with the aid of the same correction factor $K_R(vP)$ applicable for the verification transport velocity vP, for example, $I_{T1}^*(vP)=I_{T1}(vP)\cdot K_R(vP)=I_{T2}^*(vP)=I_{T2}(vP)\cdot K_R(vP)$. The verification of the respective value document on the basis of the luminescence intensities $I_{T1}^*(vP)$, $I_{T2}^*(vP)$ thus corrected can be carried out similarly to the third exemplary embodiment.

The invention claimed is:

1. A method for providing a velocity correction of at least one luminescence parameter of a value document to be verified in a sensor, which is configured to measure at least one luminescence intensity of the value document while the respective value document is transported past the sensor, and which is configured to determine at least one luminescence parameter of the respective value document on the basis of the measured at least one luminescence intensity and to verify the luminescence of the respective value document, having the following steps:

a) determining a first velocity dependence of the luminescence parameter of a reference medium excitable to luminescence emission, which corresponds to the luminescence parameter of the value document, with the aid of a reference sensor assigned to the sensor for a first transport direction of the reference medium relative to the reference sensor, and b) determining a second velocity dependence of the luminescence parameter of the reference medium, which corresponds to the luminescence parameter of the value document, with the aid of the reference sensor for a second transport direction of the reference medium, opposite to the first transport direction, relative to the reference sensor, and c) averaging the first velocity dependence of the luminescence parameter of the reference medium and the second velocity dependence of the luminescence parameter of the reference medium at the respective velocity in order to ascertain a mean velocity dependence of the luminescence parameter of the reference medium, and d) using the mean velocity dependence of the luminescence parameter of the reference medium to determine a velocity dependence of a correction factor, which is suitable for correcting the luminescence parameter of the value document to be verified, e) storing the velocity dependence of the correction factor in the sensor, f) providing a velocity correction, which is usable in the verification of the luminescence of the value document transported at a verification transport velocity past the sensor to correct the luminescence parameter determined using the sensor for the value document, in a correction unit of the sensor, wherein the correction unit for the velocity correction of the luminescence parameter of the value document is configured, on the basis of a velocity dependence of the correction factor stored in the sensor and by means of information made available to the sensor about the verification transport velocity of the value document, to determine a correction factor, which applies for the verification transport velocity of the value document, and to correct the luminescence parameter determined by the sensor for the value document with the aid of the correction factor applicable for the verification transport velocity of the value document, in order to determine a corrected luminescence parameter for the value document, wherein the sensor is configured to use the corrected luminescence parameter to verify the luminescence of the value document.

2. The method according to claim 1, wherein, with multiple sensors of the same sensor production series, the same mean velocity dependence of the luminescence parameter of the reference medium is used to determine the respective velocity dependence of the correction factor, which is used in the respective sensor for correcting the luminescence parameter of the value document to be verified, wherein the same velocity correction is provided, or the same velocity dependence of the correction factor is stored and is used for correcting the luminescence parameter determined using the respective sensor for the value document.

3. The method according to claim 1, wherein the luminescence parameter of the reference medium or the value document, which is determined for the reference medium or for the value document to be verified for the respective transport velocity and direction, is ascertained in each case on the basis of luminescence intensities measured at various measurement times by the reference sensor on the reference medium or by the sensor on the value document to be verified.

4. The method according to claim 1, wherein the luminescence parameter of the reference medium or the value document to be verified is a combined luminescence intensity of the reference medium or the value document to be verified.

5. The method according to claim 4, wherein the combined luminescence intensity comprises a luminescence intensity of the reference medium or the value document to be verified integrated or averaged over various measurement times of the reference sensor or the sensor.

6. The method according to claim 1, wherein the luminescence parameter of the reference medium or the value document to be verified is a luminescence time constant of the luminescence of the reference medium or the value document to be verified derived from a time curve of the respective measured luminescence intensities.

7. The method according to claim 1, wherein the luminescence parameter of the reference medium or the value document to be verified is a ratio of two of the measured luminescence intensities of the reference medium or the value document to be verified.

8. The method according to claim 1, wherein the luminescence parameter of the reference medium or the value document to be verified is a luminescence intensity measured at a discrete measurement time by the reference sensor on the reference medium or by the sensor on the value document.

9. The method according to claim 1, wherein the method is carried out for multiple different discrete measurement times, wherein for the various discrete measurement times, in each case the luminescence intensity measured at the respective measurement time by the reference sensor on the reference medium or the luminescence intensity measured at the respective measurement time by the sensor on the value document is used as the luminescence parameter.

10. The method according to claim 9, wherein the sensor is configured, for verifying the value document on the basis of the corrected luminescence intensities, which were determined for the respective measurement times of the value document, to determine a time constant of the luminescence of the value document and to verify the value document on the basis of the time constant.

11. The method according to claim 1, wherein for the various discrete measurement times in each case the first and second velocity dependence of the luminescence intensity measured at the respective discrete measurement time by the reference sensor on the reference medium is determined for the respective discrete measurement time, and by the averaging of this first and second velocity dependence, the respective mean velocity dependence of the respective luminescence intensity is ascertained for the respective discrete measurement time, and for the respective discrete measurement time, the respective mean velocity dependence of the respective luminescence intensity of the reference medium is used to determine a velocity dependence individual by measurement time of a correction factor applicable for the respective measurement time, which is stored in the sensor and is assigned therein to the respective discrete measurement time, and in that the correction unit for the velocity correction of luminescence intensities of the respective value document, which the sensor measures at corresponding measurement times on the value document, is configured to, for each of the luminescence intensities measured at the corresponding measurement times by the sensor on the value document, on the basis of the velocity dependence of the correction factor individual by measurement time, which is stored in the sensor, and by means of the information provided to the sensor about the verification transport velocity of the value document, to determine a correction factor individual by measurement time, which applies for the respective corresponding measurement time of the value document and for the verification velocity of the value document, and to correct the luminescence intensity measured on the value document at the corresponding measurement time with the aid of the correction factor, which is individual by measurement time, applicable for the respective corresponding measurement time and for the verification transport velocity of the value document, in order to determine a corrected luminescence intensity for the respective corresponding measurement time of the value document, wherein the sensor is designed to use the corrected luminescence intensities, which were determined for the corresponding measurement times, for verifying the luminescence of the respective value document.

12. The method according to claim 1, wherein for multiple different discrete measurement times, the luminescence intensity measured at the respective measurement time by the reference sensor on the reference medium or by the sensor on the value document is used in each case as the luminescence parameter, wherein for the various discrete measurement times, in each case the first and the second velocity dependence of the luminescence intensity measured at the respective discrete measurement time by the reference sensor on the reference medium is determined for the respective discrete measurement time, and for the various discrete measurement times, in each case by averaging of this first and second velocity dependence, the respective mean velocity dependence of the respective luminescence intensity for the respective discrete measurement time is ascertained, and on the basis of the mean velocity dependencies of the respective luminescence intensity, which were ascertained for the various discrete measurement times, by averaging over the various discrete measurement times, a representative velocity dependence of the correction factor is determined, which applies independently of the measurement time, in that the correction unit for the velocity correction of luminescence intensities of the respective value document, which the sensor measures at multiple measurement times on the value document, is configured, for each of the luminescence intensities measured by the sensor on the value document at the measurement times, on the basis of the representative velocity dependence of the correction factor stored in the sensor and by means of the information about the verification transport velocity of the value document provided to the sensor, to determine a representative correction factor, which applies for the measurement times of the value document and for the verification transport velocity of the value document, and to correct the luminescence intensity measured on the value document at the respective measurement time with the aid of the representative correction factor applicable for the verification transport velocity of the value document, in order to determine a corrected luminescence intensity for the respective measurement time of the value document, wherein the sensor is designed to use the corrected luminescence intensities, which were determined for the measurement times of the value document, for verifying the luminescence of the respective value document.

13. A sensor for verifying value documents, which are transported past the sensor along a transport direction at a verification transport velocity for their verification, wherein the sensor includes at least one excitation light source for exciting a luminescence of the respective value document, and includes at least one photodetector for detecting the luminescence of the value document excited by the excitation light source, is configured to measure at least one luminescence intensity of the value document while the value document is transported past the sensor by means of the at least one photodetector, and includes an evaluation unit, which is designed to determine a luminescence parameter of the respective value document on the basis of the at least one luminescence intensity of the value document measured at the verification transport velocity, and includes a correction unit, in which a velocity correction for correcting the luminescence parameter determined using the sensor for the value document is provided, according to claim 1, which is usable in the verification of the luminescence of a value document transported past the sensor at a verification transport velocity for correcting the luminescence parameter determined for the value document, and wherein a velocity dependence of a correction factor is stored in the sensor, which is suitable for correcting the luminescence parameter of the value document to be verified, and wherein the correction unit for the velocity correction of the luminescence parameter of the value document transported past the sensor at a verification transport velocity is configured, on the basis of the velocity dependence of the correction factor stored in the sensor and by means of information provided to the sensor about the verification transport velocity of the value document, to determine a correction factor, which applies for the verification transport velocity of the value document, and to correct the luminescence parameter determined by the sensor for the value document with the aid of the correction factor applicable for the verification transport velocity of the value document, in order to determine a corrected luminescence parameter for the value document, and wherein the sensor is designed to use the corrected luminescence parameter for verifying the luminescence of the value document.

14. The sensor according to claim 13 wherein the luminescence parameter of the reference medium or the value document to be verified is a combined luminescence intensity of the reference medium or the value document to be verified, or is a luminescence time constant of the reference medium or the value document to be verified derived from a time curve of the measured luminescence intensity, or is a ratio of the luminescence intensities of two different measurement times of the reference medium or the value document to be verified or the ratio of the luminescence intensities of the reference medium or the value document to be verified measured in two different spectral channels, or is a luminescence intensity measured at a discrete measurement time by the reference sensor on the reference medium or by the sensor on the value document, or in that for multiple different discrete measurement times, the luminescence intensity measured at the respective measurement time by the reference sensor on the reference medium or by the sensor on the value document is used in each case as the luminescence parameter.

15. A device for processing value documents comprising:

a sensor according to claim 13, and a transport unit for transporting the respective value document to be verified past the sensor along a transport direction at a verification transport velocity.

16. A method for verifying value documents by way of the sensor according to claim 13, wherein the following steps are carried out:

A) transporting a value document to be verified past the sensor along a transport direction at a verification transport velocity and measuring at least one luminescence intensity of the value document by means of the sensor while the value document is transported past the sensor, B) providing information about the verification transport velocity of the value document in the sensor, C) determining a correction factor, which applies for the verification transport velocity of the value document, on the basis of the velocity dependence of the correction factor stored in the sensor and by means of the information provided to the sensor about the verification transport velocity, D) determining at least one luminescence parameter of the value document at the verification transport velocity on the basis of the at least one luminescence intensity of the value document measured at the verification transport velocity, E) correcting the luminescence parameter of the value document with the aid of the correction factor applicable for the verification transport velocity of the value document, to determine a corrected luminescence parameter for the value document, F) using the corrected luminescence parameter to verify the value document.

* * * * *